US010912425B2

(12) United States Patent
Callicoat

(10) Patent No.: US 10,912,425 B2
(45) Date of Patent: Feb. 9, 2021

(54) LIQUID PRODUCT PUMP DEVICES, SYSTEMS, AND METHODS OF USING THE SAME

(71) Applicant: Clay Callicoat, Carmel, IN (US)

(72) Inventor: Clay Callicoat, Carmel, IN (US)

(*) Notice: Subject to any disclaimer, the term of this patent is extended or adjusted under 35 U.S.C. 154(b) by 0 days.

(21) Appl. No.: 16/858,485

(22) Filed: Apr. 24, 2020

(65) Prior Publication Data

US 2020/0253428 A1 Aug. 13, 2020

Related U.S. Application Data

(63) Continuation of application No. 15/576,181, filed as application No. PCT/US2016/033604 on May 20, 2016.

(60) Provisional application No. 62/165,867, filed on May 22, 2015.

(51) Int. Cl.

*A47K 5/12* (2006.01)
*G01F 11/02* (2006.01)
*B05B 11/00* (2006.01)

(52) U.S. Cl.

CPC ........ *A47K 5/1207* (2013.01); *B05B 11/0008* (2013.01); *B05B 11/3015* (2013.01); *G01F 11/02* (2013.01); *A47K 2005/1218* (2013.01)

(58) Field of Classification Search

CPC .......... A47K 5/1207; A47K 2005/1218; B05B 11/3015; B05B 11/0008; G01F 11/02
See application file for complete search history.

(56) References Cited

U.S. PATENT DOCUMENTS 1,933,192 A 10/1933 Taylor
4,019,661 A 4/1977 Szabo
4,212,332 A * 7/1980 Kutik .................. B05B 11/0005 141/98
4,360,130 A 11/1982 Nishimuta et al.
4,364,718 A 12/1982 Beun et al.
4,535,918 A * 8/1985 Heiligman ........... B67D 7/0266 222/185.1
4,776,498 A 10/1988 Maerte et al.

(Continued)

FOREIGN PATENT DOCUMENTS

WO 2015/020657 A1 2/2015

OTHER PUBLICATIONS

International Searching Authority, International Search Report, PCT/US2016/033604, dated Aug. 19, 2016.

(Continued)

*Primary Examiner* — David P Angwin
*Assistant Examiner* — Randall A Gruby
(74) *Attorney, Agent, or Firm* — Reichel Stohry Dean LLP; Mark C. Reichel; Natalie J. Dean

(57) ABSTRACT

Liquid product pump devices, systems, and methods of using the same. An exemplary system of the present disclosure comprises a device, comprising a pump mechanism coupled to a receiving tube whereby a distal end of the receiving tube extends into a skirt, wherein when the skirt is attached to a neck of an bottle having liquid contents therein and wherein when the device rests within or upon a pump base, pressing the inverted bottle and the pump base toward one another causes a portion of the liquid contents to transfer from the inverted bottle and out of the pump base, and further comprises the bottle and the pump base.

18 Claims, 15 Drawing Sheets

(56) References Cited

U.S. PATENT DOCUMENTS

| | | | | |
|---|---|---|---|---|
| 5,102,010 | A * | 4/1992 | Osgar | B65D 47/36 222/1 |
| 5,337,922 | A | 8/1994 | Salkeld et al. | |
| 5,341,967 | A | 8/1994 | Silvenis | |
| 5,373,970 | A * | 12/1994 | Ophardt | A47K 5/1207 222/181.2 |
| 5,467,901 | A | 11/1995 | Foster et al. | |
| 5,611,467 | A | 3/1997 | Peng | |
| 5,624,060 | A | 4/1997 | Ellion et al. | |
| 5,636,670 | A | 6/1997 | Baker | |
| 5,775,548 | A | 7/1998 | Hohmann et al. | |
| 5,897,032 | A | 4/1999 | Ellion et al. | |
| 6,045,008 | A * | 4/2000 | Gonzalez Fernandez | B05B 11/306 222/153.13 |
| 6,688,499 | B2 | 2/2004 | Zhang | |
| 6,986,443 | B2 | 1/2006 | Laible | |
| 7,004,356 | B1 * | 2/2006 | Sayers | B05B 7/0037 222/137 |
| 7,011,237 | B1 | 3/2006 | Sayers et al. | |
| 7,389,893 | B2 | 6/2008 | Kasting | |
| 7,458,665 | B2 * | 12/2008 | Batista | B41J 2/17509 222/83 |
| 8,418,889 | B2 | 4/2013 | Pritchett et al. | |
| 8,763,863 | B2 | 7/2014 | Quinlan et al. | |
| 10,414,296 | B2 * | 9/2019 | Smuk | B60N 2/236 |
| 2005/0224519 | A1 | 10/2005 | Law et al. | |
| 2007/0295753 | A1 | 12/2007 | Vangeel et al. | |
| 2009/0212072 | A1 | 8/2009 | Fenton | |
| 2014/0332477 | A1 | 11/2014 | Troost | |
| 2020/0178735 | A1 * | 6/2020 | Miedzius | A47K 5/1207 |

OTHER PUBLICATIONS

International Searching Authority, Written Opinion of the International Searching Authority, PCT/US2016/033604, dated Aug. 19, 2016.

* cited by examiner

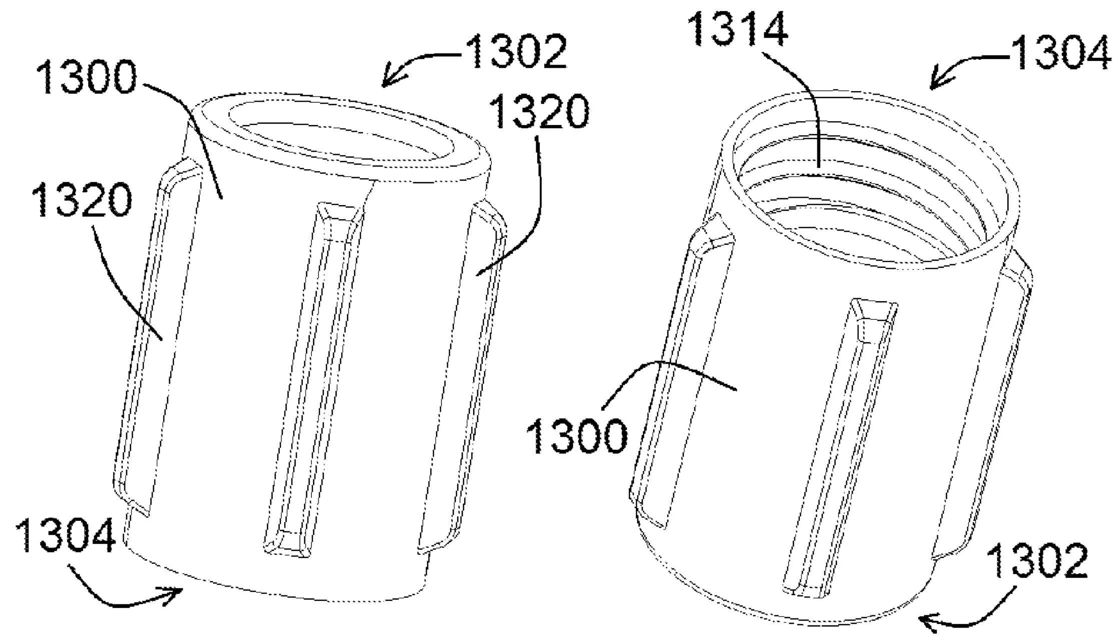
FIG. 13A
FIG. 13B
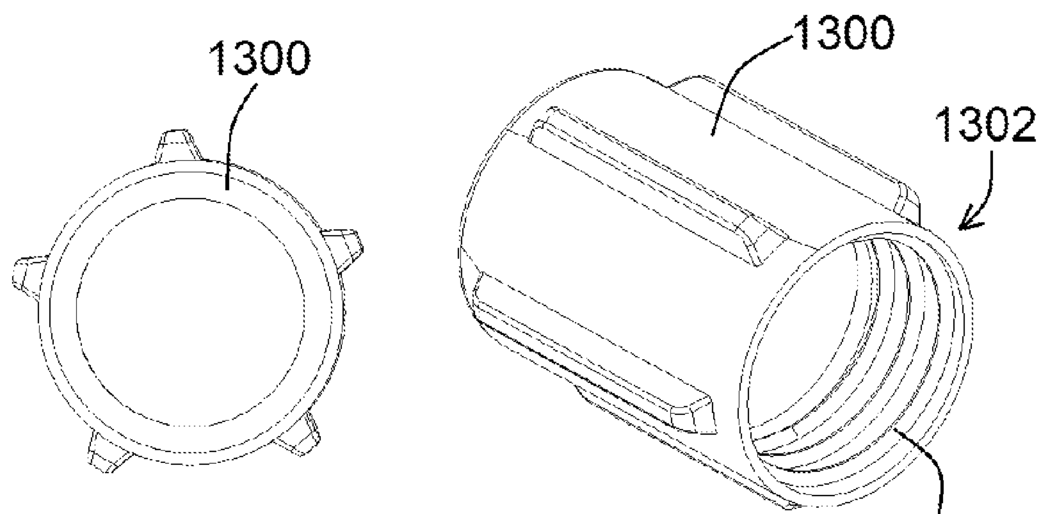
FIG. 13C
FIG. 13D

LIQUID PRODUCT PUMP DEVICES, SYSTEMS, AND METHODS OF USING THE SAME

PRIORITY

The present application is related to, claims the priority benefit of, and is a U.S. continuation application of, U.S. patent application Ser. No. 15/576,181, filed Nov. 21, 2017, which is related to, and is a U.S. § 371 National Stage patent application of, International Patent Application Serial No. PCT/US2016/033604, filed May 20, 2016, which is related to, and claims the priority benefit of, U.S. Provisional Patent Application Ser. No. 62/165,867, filed May 22, 2015. The contents of each of these applications are incorporated directly and by reference in their entirety into this disclosure.

BACKGROUND

Existing soap, lotion, hand sanitizer, and other liquid product pump and bottle configurations cannot efficiently extract all of the product from the bottle due to, for example, the ratio of the dip tube versus the surface area of the bottle base. It is estimated that traditional pumps with dip tubes leave 5%, 10%, or even more of the contents trapped within the bottle.

In view of the same, devices and systems for removing liquid contents from a bottle so that most, if not all, of the liquid contents can be removed using a pump, would solve the traditional problems and be well received in the marketplace.

BRIEF SUMMARY

In an exemplary embodiment of a device for removing liquid contents from an inverted bottle of the present disclosure, the device comprises a pump mechanism coupled to a receiving tube whereby a distal end of the receiving tube extends into a skirt, extends to a distal end of the skirt, or extends distal to the distal end of the skirt, wherein when the skirt is attached to a neck of an inverted bottle having liquid contents therein and wherein when the device rests within a pump base, pressing the inverted bottle downward causes a portion of the liquid contents to transfer from the inverted bottle and out of the pump base. In at least one embodiment, the distal end of the receiving tube extends into the skirt but not to the distal end of the skirt. In various embodiments, the distal end of the receiving tube extends to the distal end of the skirt. In at least one embodiment, the device further comprises a first gasket coupled to the receiving tube, the first gasket sized and shaped to occlude a distal opening of the skirt when the neck of the inverted bottle is attached to the skirt. In various embodiments, the first gasket prevents the liquid contents from migrating from the inverted bottle beyond the first gasket.

In an exemplary embodiment of a device for removing liquid contents from an inverted bottle of the present disclosure, the distal end of the receiving tube extends distal to the distal end of the skirt, and wherein the device further comprises a first gasket coupled to the receiving tube, the first gasket sized and shaped to occlude an opening of the neck of the bottle when the neck of the inverted bottle is attached to the skirt. In various embodiments, the first gasket prevents the liquid contents from migrating from the inverted bottle beyond the first gasket. In at least one embodiment, the distal end of the receiving tube extends into the neck of the inverted bottle, to an internal end of the neck of the inverted bottle, but not beyond the internal end of the neck of the inverted bottle.

In an exemplary embodiment of a system for removing liquid contents from an inverted bottle of the present disclosure, the system comprises exemplary device of the present disclosure and one or both of a bottle and/or a pump base.

The present disclosure includes disclosure of a device for facilitating the removal of a liquid product from within an inverted bottle, comprising a pump mechanism having a receiving tube extending into and surrounded by a skirt, but not beyond the distal end of the skirt, and having a gasket extending to at least a perimeter of the neck of the inverted bottle when the skirt is attached to the neck of the inverted bottle, the skirt positioned around the receiving tube, such that the pump is operable to transfer the liquid product from the inverted bottle out of the receiving tube by pressing a bottom of the inverted bottle toward the pump mechanism.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIGS. 13A and 13B show perspective views of adapters, according to exemplary embodiments of the present disclosure;

FIG. 13C shows an end view of an adapter, according to an exemplary embodiment of the present disclosure;

FIG. 13D shows a perspective view of an adapter, according to an exemplary embodiment of the present disclosure;

Figure 1:
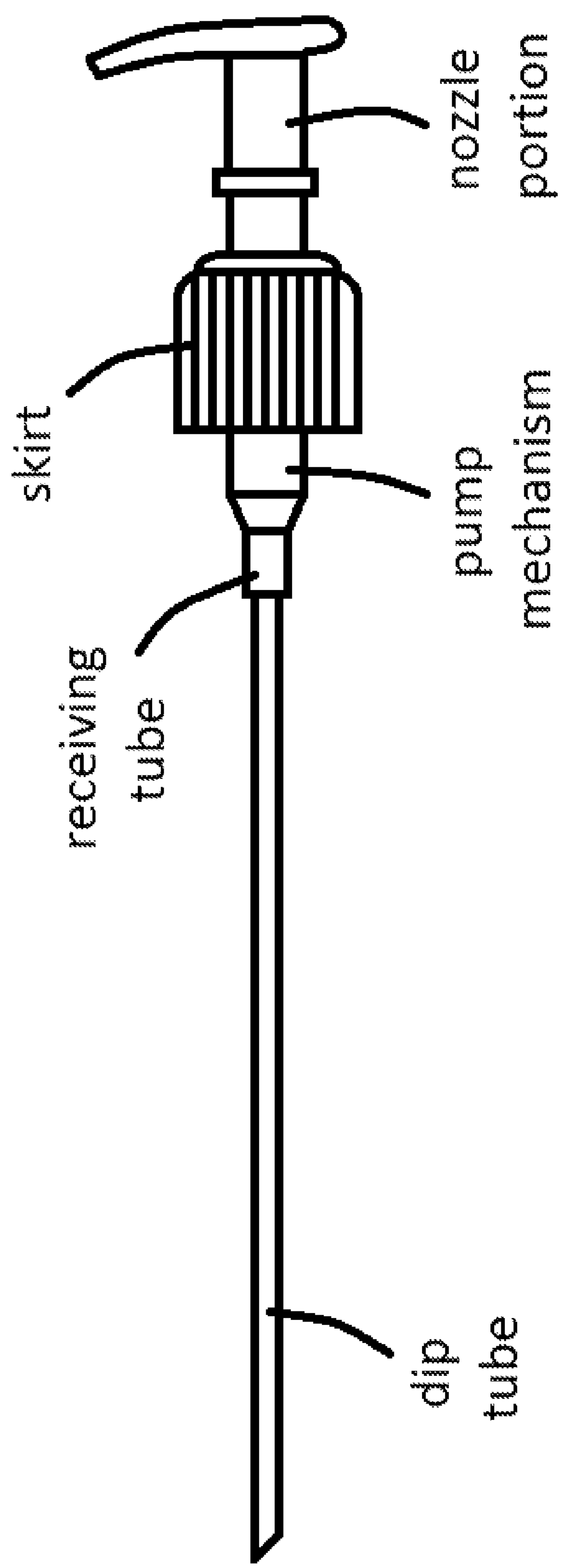
FIG. 1 shows a prior art pump.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of a pump mechanism useful to provide controlled release of product from within an inverted bottle.

FIG. 1 shows a lotion or soap pump known in the art, labeled as "PRIOR ART." As shown therein, such a lotion or soap pump comprises a pump mechanism having a receiving tube at its distal end, and an elongated dip tube extending from the receiving tube so that when the pump is operated (by way of depressing the nozzle portion), liquid contents from within a bottle (not shown) enter into the dip tube (pulled in via the pump mechanism), into the receiving tube, into the pump mechanism, and out of the nozzle portion to deliver the contents to the user. Such a lotion or soap pump has been used for years and is generally suitable to deliver lotion, soap, hand sanitizer, or other liquid products from bottles to the users. However, such pumps are not able to deliver all or significantly all of the contents within the bottle to the user, resulting in a significant portion of wasted, inaccessible content within each bottle of product consumed around the world. Furthermore, should the bottle and pump be inverted, the vast majority of the contents of the bottle could not be extracted from the bottle due to the distal end of the dip tube being above the settled liquid contents of the bottle.

The present disclosure includes disclosure of devices for extracting all or significantly all of the liquid contents of a bottle when the bottle and device are inverted, namely upside-down (bottle on top).

Figure 2:
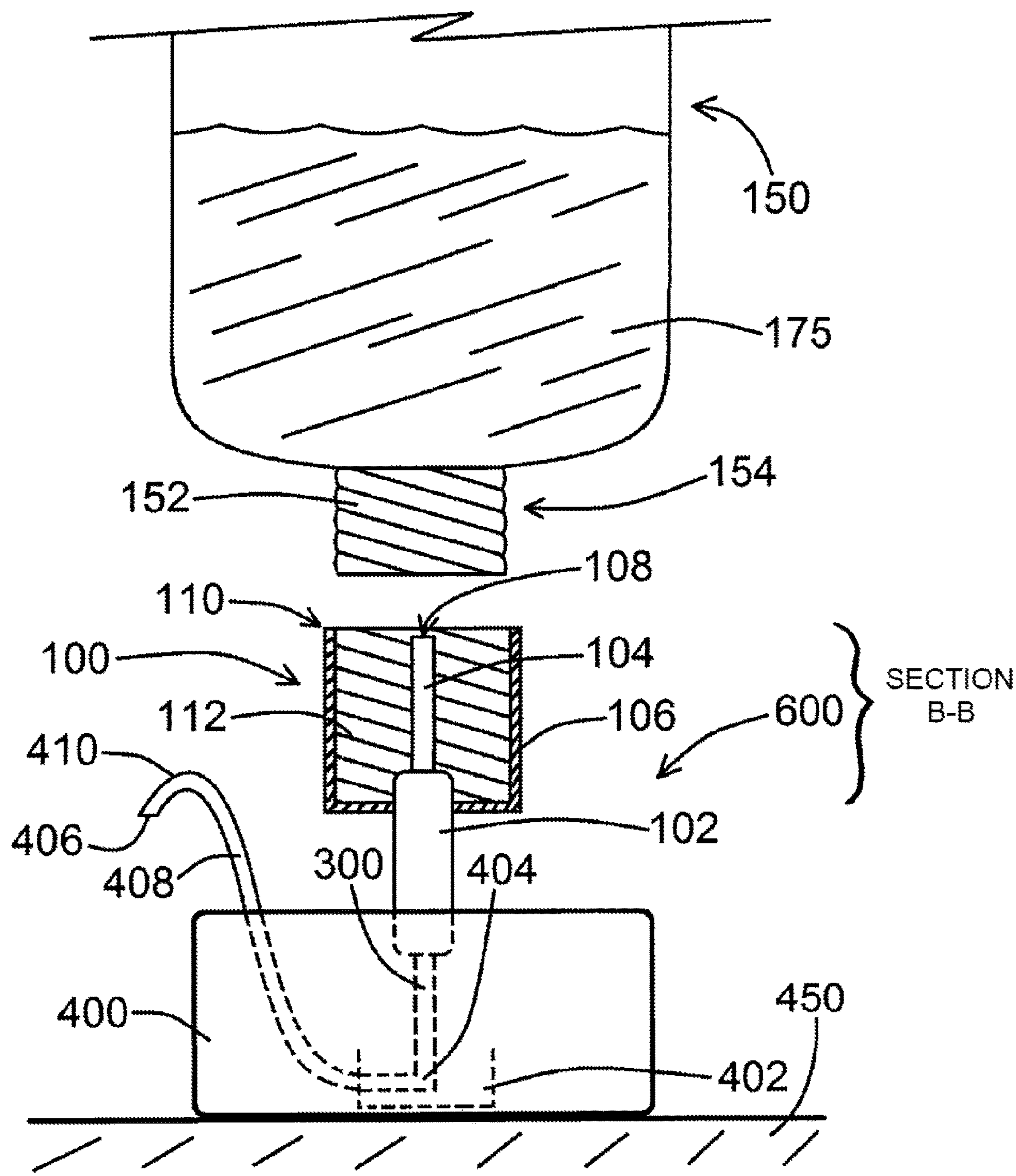
FIG. 2 shows a cut-away view of portions of a device and system for extracting liquid contents from a bottle, according to an exemplary embodiment of the present disclosure.
Figure 6:
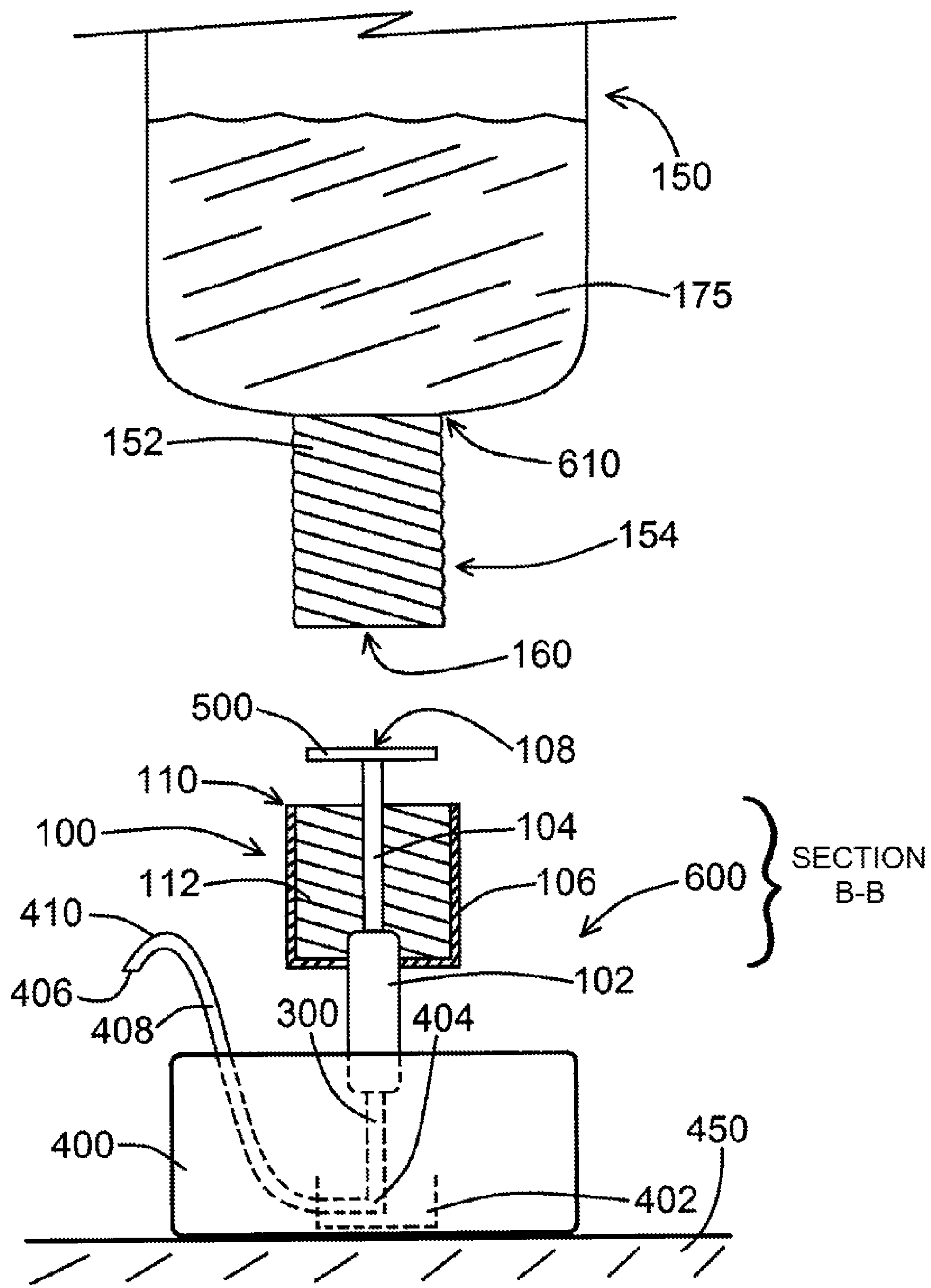
FIG. 6 shows a cut-away view of portions of a device and system for extracting liquid contents from a bottle, according to an exemplary embodiment of the present disclosure.

FIG. 2 shows an exemplary device for facilitating the removal of a liquid product from within an inverted bottle of the present disclosure. As shown in FIG. 2, device 100 comprises a pump mechanism 102 having a receiving tube 104 extending into and at least partially surrounded by a skirt 106. In at least one device 100 embodiment of the present disclosure, distal end 108 of receiving tube 104, as shown in the embodiment shown in FIG. 2, can extend proximal to, even with, but not distal to, a distal end 110 of the skirt 106. Receiving tube 104 may be coupled to or formed as part of pump mechanism 102. As shown in FIG. 2, receiving tube 104 extends within skirt 106 but terminates proximal to the distal end 110 of skirt 106. In other embodiments, such as shown in FIG. 6 and referenced in further detail herein, distal end 108 of receiving tube 104 can extend distal to a distal end 110 of skirt 106, but in such an embodiment, a) a gasket 500 (as referenced in further detail herein) would be utilized, and b) the distal end 108 of receiving tube 104 would extend into a neck 154 of a bottle 150, but not beyond neck 154 of bottle 150.

Such an exemplary device 100 embodiment is significantly different from prior art pumps, such as shown in FIG. 1. First, and as can be seen by way of comparing FIG. 1 to FIG. 2, receiving tube 104 does not extend distal to a distal end 110 of skirt 106. Perhaps more importantly, devices 100 of the present disclosure do not include a dip tube, such as shown in FIG. 1, which is intended to extend to or substantially to a relative bottom of a bottle 150 so to provide access to contents 175 (also referred to as a quantity of liquid product) of a bottle 150 over time. Devices 100 of the present disclosure do not preclude the use of, for example, a cylindrical tube or other element coupled to or formed as part of a receiving tube 104, but in device 100 embodiments as referenced herein that may utilize such a tube, the distal end of such a tube or other element would not extend distal to distal end 110 of skirt 106.

Skirts 106, in various embodiments, are threaded (as indicated by threads 112 in FIG. 2) so to correspond to threads 152 of a neck 154 of a bottle 150. FIG. 2 shows a portion of a bottle 150 having a quantity of liquid product 175 therein, whereby threads 152 along neck 154 of bottle 150 correspond to threads 112 within skirt 106 so that bottle 150 could rotatably couple to skirt 106. At least neck 154 and skirt 106 are drawn to scale within FIG. 2, with other components related thereto drawn to scale or substantially drawn to scale.

Figure 3:
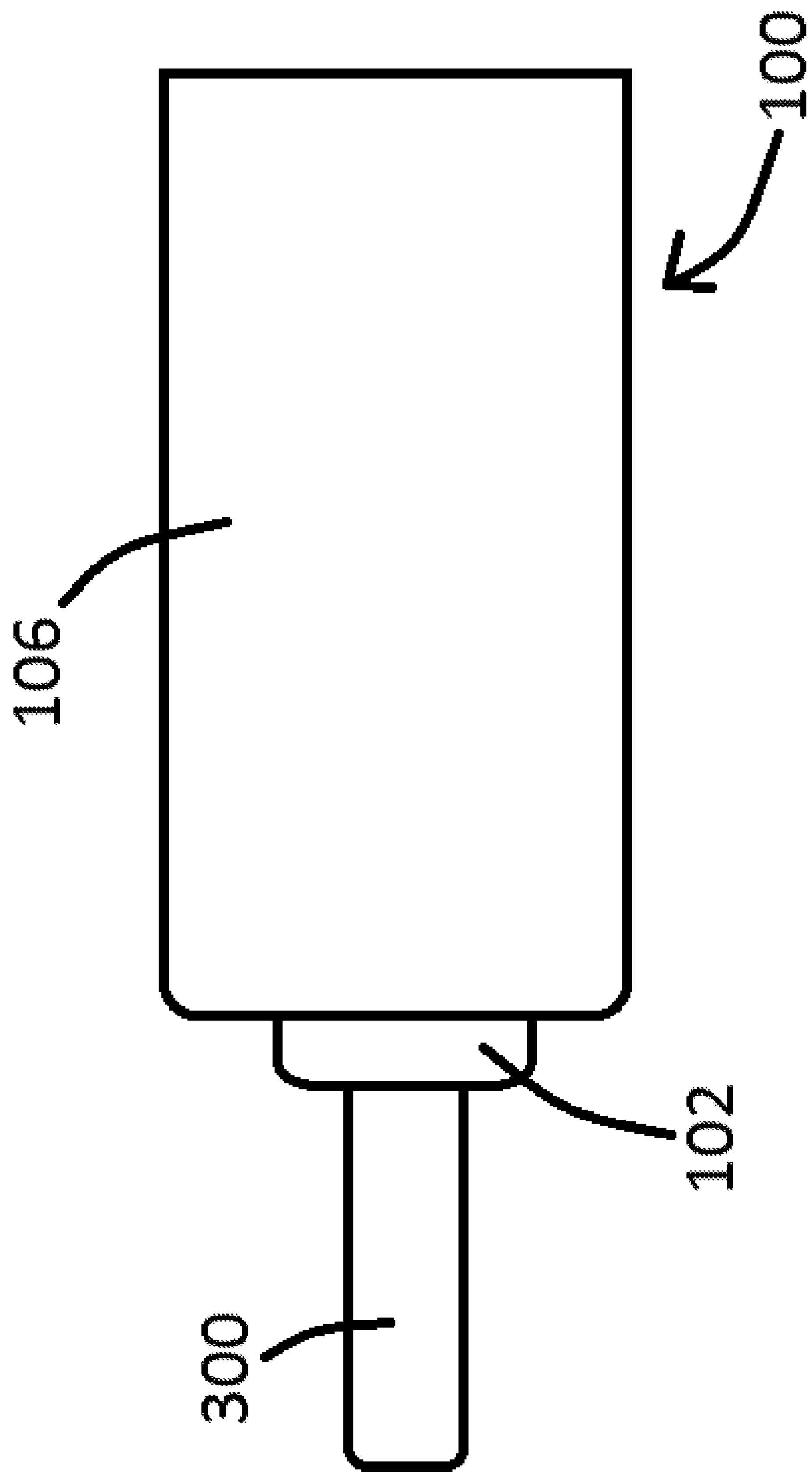
FIG. 3 shows a side view of parts of a device, according to an exemplary embodiment of the present disclosure.

FIG. 3 shows portions of an exemplary device 100 of the present disclosure. As shown therein, skirt 106 is relatively longer than traditional skirts known in the art, configured so that portions of the pump mechanism 102 that may be positioned within skirt 106 do not extend distal to the distal end 110 of skirt 106. FIG. 3 also shows a pump tube 300 positioned proximal to pump mechanism 102 (not shown in the figure) and generally proximal to skirt 106, whereby pump tube 300 can couple to a pump base 400, such as shown in FIGS. 2 and 4.

Figure 4:
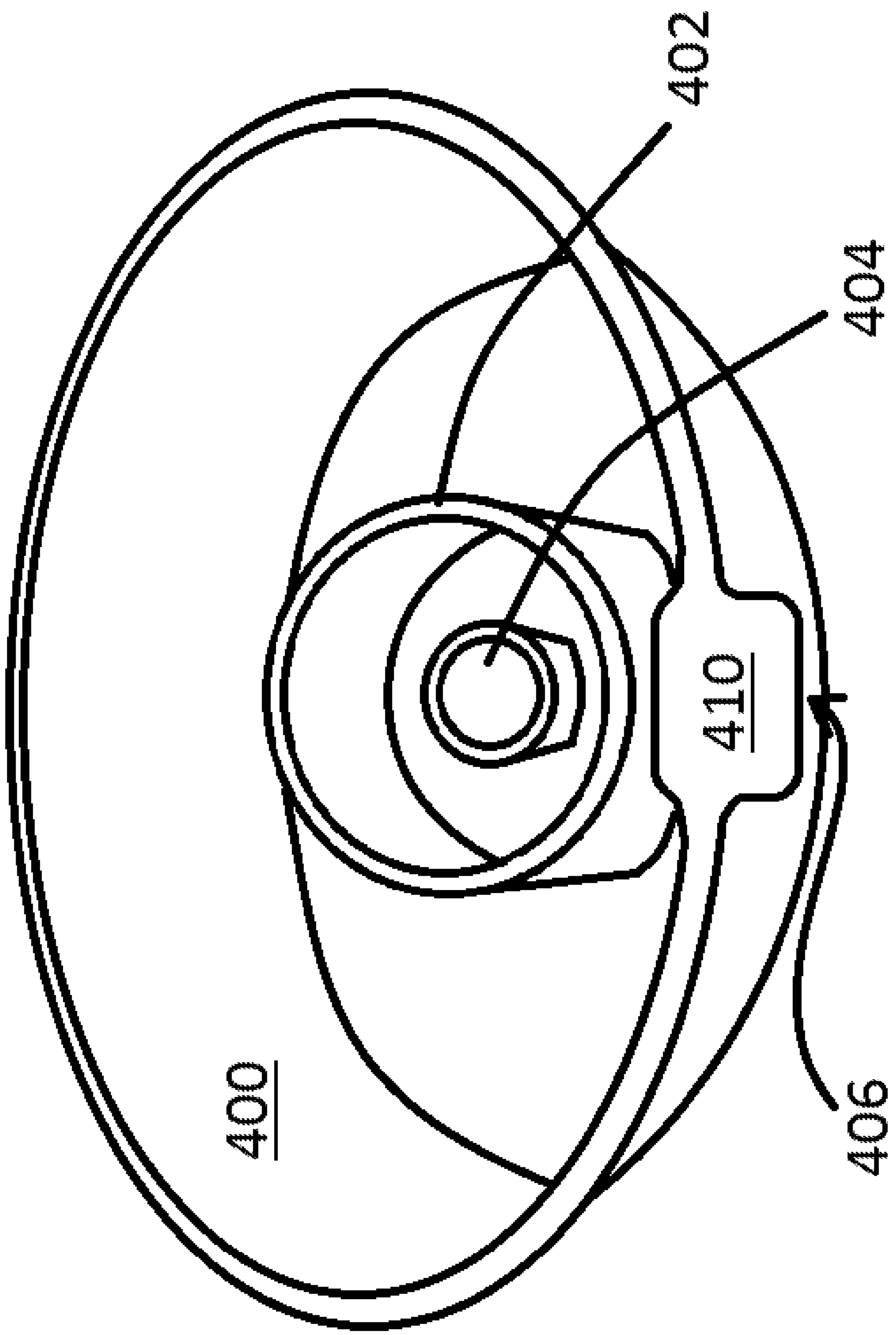
FIG. 4 shows a perspective view of a pump base, according to an exemplary embodiment of the present disclosure.

FIGS. 2 and 4 show an exemplary pump base 400 of the present disclosure. As shown in FIG. 2, pump base 400 is configured to rest upon a substrate 450, such as a countertop, table, desk, or the like, and to retain an inverted bottle 150 having liquid contents 175 therein. Pump base 400, as shown in FIGS. 2 and 4, defines a first recessed portion 402 defining an aperture 404 therein. Aperture 404 is in communication with a base opening 406 defined within spout 410 of base 400 so that an effective lumen 408 (as shown in FIG. 2) extends from aperture 404 to base opening 406. Base opening 406 of spout 410, as shown in FIG. 2, is relatively higher than aperture 404 within base 400, so to prevent unintended leakage of contents 175 from within bottle 150 and also to provide a space for a user to place his or her hand or a receptacle to receive some of the contents 175 by depressing bottle 150 downward. In view of the same, at least part of spout 410 is positioned relatively higher than aperture 404 of pump base 400.

Figure 5:
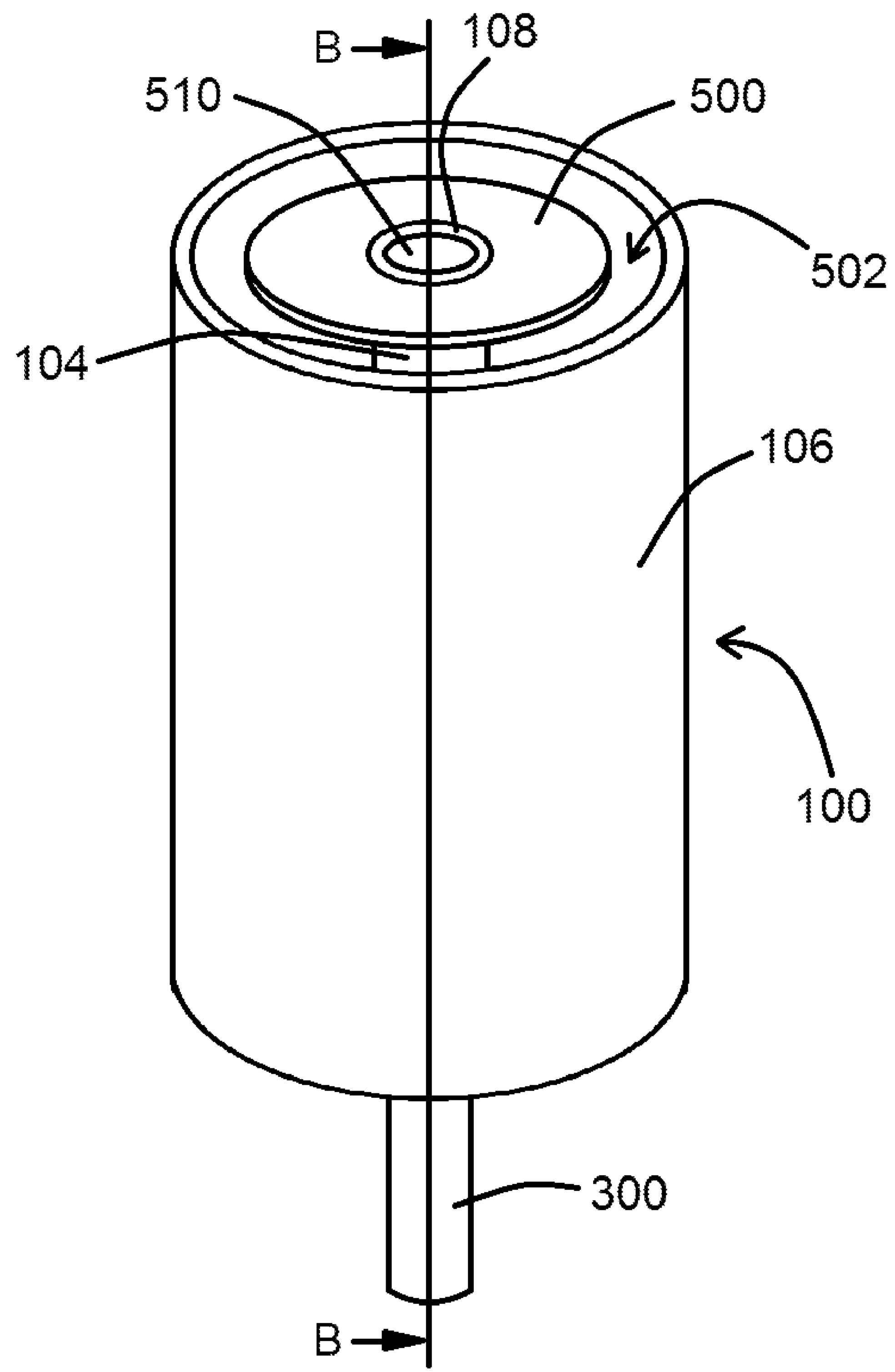
FIG. 5 shows a perspective view of parts of a device, according to an exemplary embodiment of the present disclosure.

FIG. 5 shows portions of an exemplary device 100 of the present disclosure, whereby an optional gasket 500 is used to obstruct a distal opening 502 of a skirt 106 of the present disclosure. Gasket 500, as shown in FIG. 5, snugly fits around receiving tube 104 so to prevent contents from within bottle 150 from entering distal opening 502 and therefore into the space defined by skirt 106. The purpose of such a gasket 500 is therefore to further facilitate the ultimate removal of all or substantially all of the contents from within bottle 150 and not undesirably "trapping" product within parts of bottle 150 and/or device 100. As shown in FIG. 5, gasket 500 is dimensioned so that the portion of distal opening 502 that is not blocked/occluded by gasket 500 allows a neck 154 of bottle 150 to be inserted into skirt 106 so that gasket 500 fits within a relative internal diameter of neck 154 to prevent contents 175 of bottle 150 from entering into skirt 106 when bottle 150 is connected to device 100 and is inverted so that bottle 150 is relatively above device 100. When in use, contents 175 from bottle 150 can enter distal opening 510 of receiving tube 104 and ultimately contact pump mechanism 102 (as shown in other figures) and expelled from device 100 to the user.

FIG. 6 shows an exemplary system 600 of the present disclosure. In FIG. 6, and similar to FIG. 2, at least neck 154 and skirt 106 are drawn to scale, with other components related thereto drawn to scale or substantially drawn to scale. As shown in FIG. 6, distal end 108 of receiving tube 104 does extend beyond a distal end 110 of skirt 106. However, and as referenced above regarding such an embodiment, a gasket 500 is coupled to receiving tube 104 and configured so that when bottle 150 is rotatably or otherwise attached to skirt 106, gasket 500 is still positioned within, but not distal to, neck 154 of bottle 150. Internal end 610 of neck 154 is shown in FIG. 6, and as generally referenced herein, device 100 embodiments whereby a distal end 108 of receiving tube 104 extends distal to a distal end 110 of skirt 106 are configured for use with bottles 150 whereby necks 154 are of a sufficient length relative to skirts 106 so that when bottle 150 is coupled to skirt 106, the distal end 108 of receiving tube extends within neck 154 proximal to internal end 610 of neck 154 or to internal end 610 of neck 154, but not beyond (distal to) internal end 610 of neck 154 of said bottles 150, as if they did, contents 175 would be able to enter skirt 106 and not be able to be pumped out by a user as desired. In such an embodiment, for example, gasket 500 is sized and shaped to occlude an opening 160 of neck 154 of bottle 150 when neck 154 of bottle 150 is attached to skirt 106.

Figure 7:
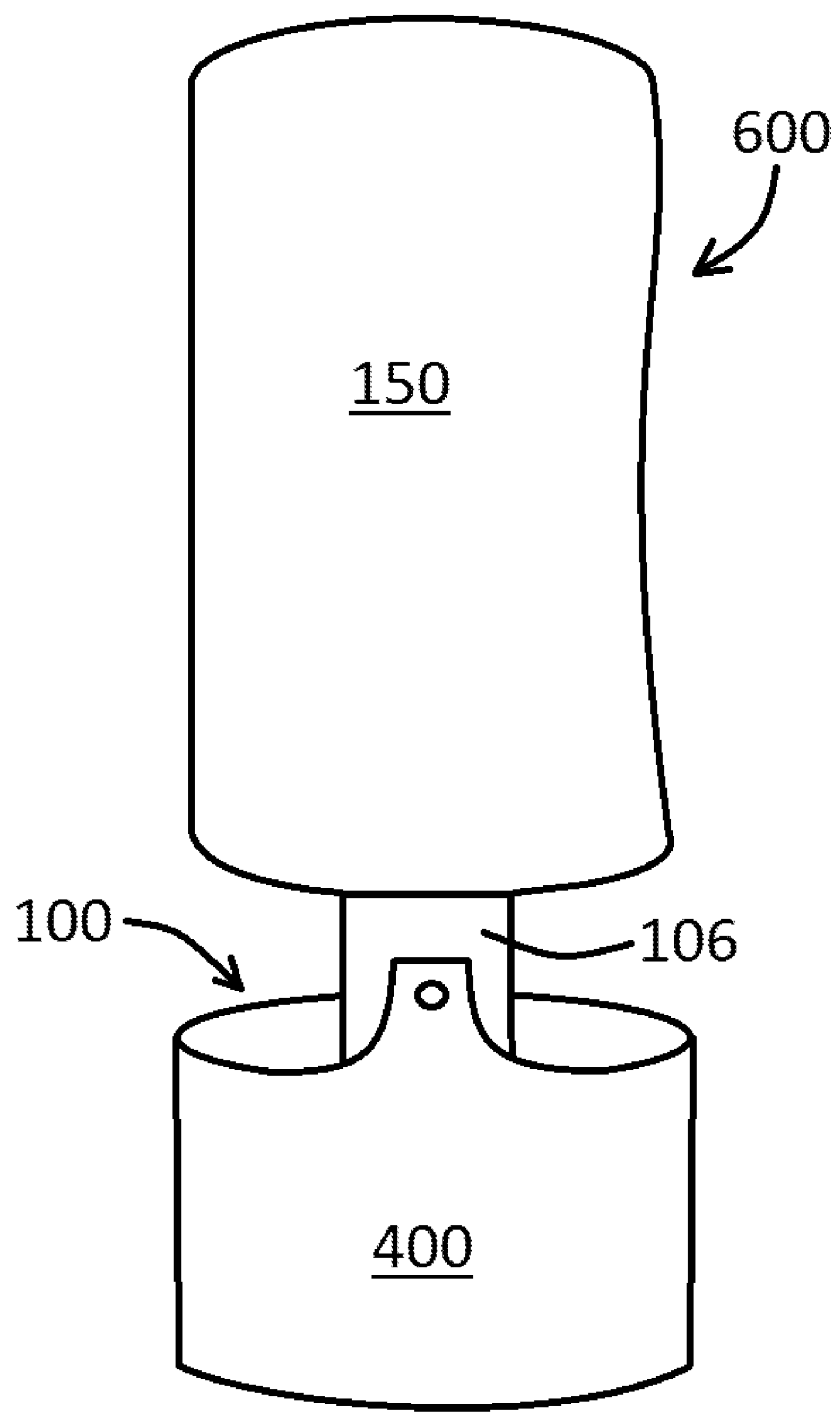
FIG. 7 shows a device connected to a bottle according to an exemplary embodiment of the present disclosure.

FIG. 7 shows an exemplary system 600 of the present disclosure. In such an embodiment, system 600 comprises an exemplary device 100 of the present disclosure coupled to a bottle 150. Systems 600 can include/comprise other elements (such as pump base 400), but in various embodiments, systems 600 comprise a device 100 and a bottle 150.

Figure 8:
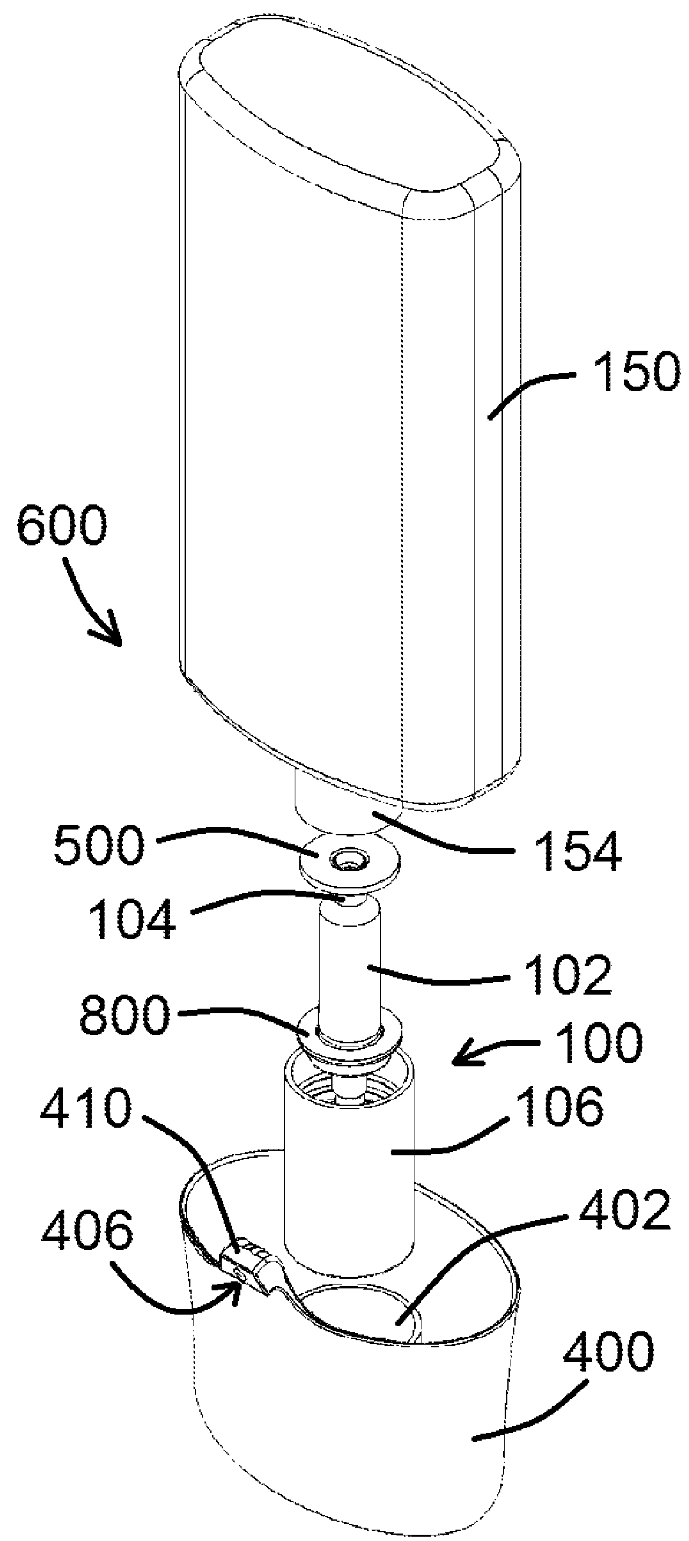
FIG. 8 shows a perspective view of portions of a device and system, according to an exemplary embodiment of the present disclosure.

FIG. 8 shows an exploded view of exemplary portions of a device 100 of the present disclosure along with a bottle 150 and an exemplary pump base 400 of the present disclosure. An exemplary system 600 of the present disclosure, as shown in FIG. 8, can comprise an exemplary device 100, an exemplary pump base 400, and a bottle 150. Device 100 and pump base 400 may also be referred to as an exemplary system 600. Pump base 400 can also be considered as part of a device 100 or separately be considered as part of a system 600 along with a device 100. FIG. 8 also shows the use of a second gasket 800, in addition to the use of a first gasket 500, whereby second gasket 800 is positioned relatively below first gasket 500, and whereby second gasket 800 is positioned around part of pump mechanism 102 (as shown in the figure) or otherwise positioned within skirt 106, so to prevent undesired migration of contents 175 into skirt 106 that cannot therefore be pumped out by a user. Other elements as referenced herein are also shown in FIG. 8.

Figure 9:
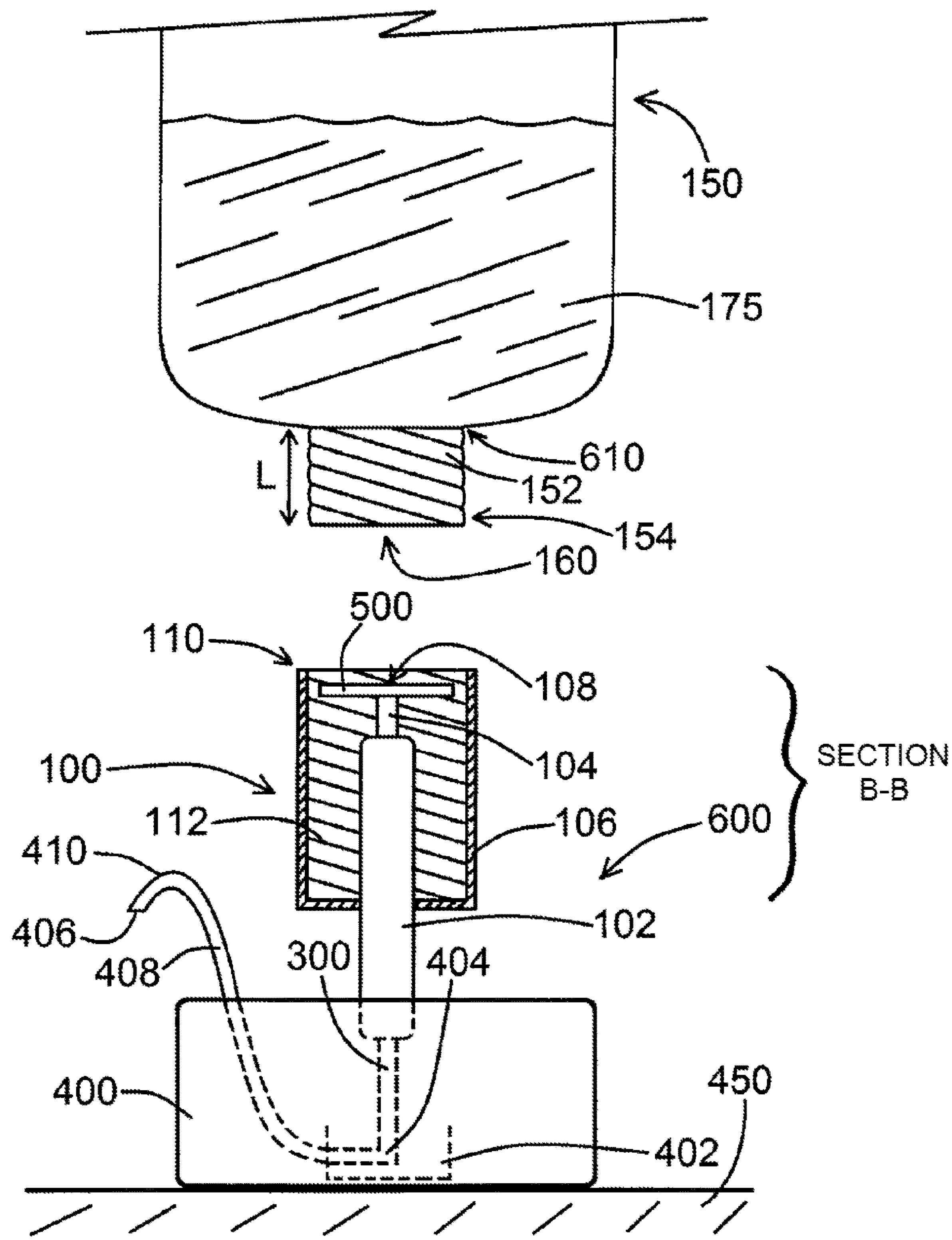
FIGS. 9 and 10 show cut-away views of portions of devices and systems for extracting liquid contents from a bottle, according to exemplary embodiments of the present disclosure.

FIG. 9 shows another embodiment of an exemplary system 600 of the present disclosure. As shown therein, portions of system 600 are relatively similar to those shown in FIG. 6, except that a) neck 154 of bottle 150 is relatively shorter, such as necks 154 having a relative length "L" (as shown in the figure) of ¾", 1", or shorter or longer depending on bottle 150 embodiment, and b) skirt 106 is relatively longer than shown in FIG. 6, so that skirt 106 circumferentially surrounds gasket 500. Pump mechanism 104 is also shown as being longer than shown in FIG. 6, and in various embodiments, pump mechanisms 104 are approximately 1", 1¼", 1½", or 2" in length, or longer or shorter. Receiving tube 104, also as shown in FIG. 9, is relatively shorter than shown in FIG. 6, as depending on embodiment, receiving tube can be ¼" long, ½" long, 1" long, or longer or shorter.

Figure 10:
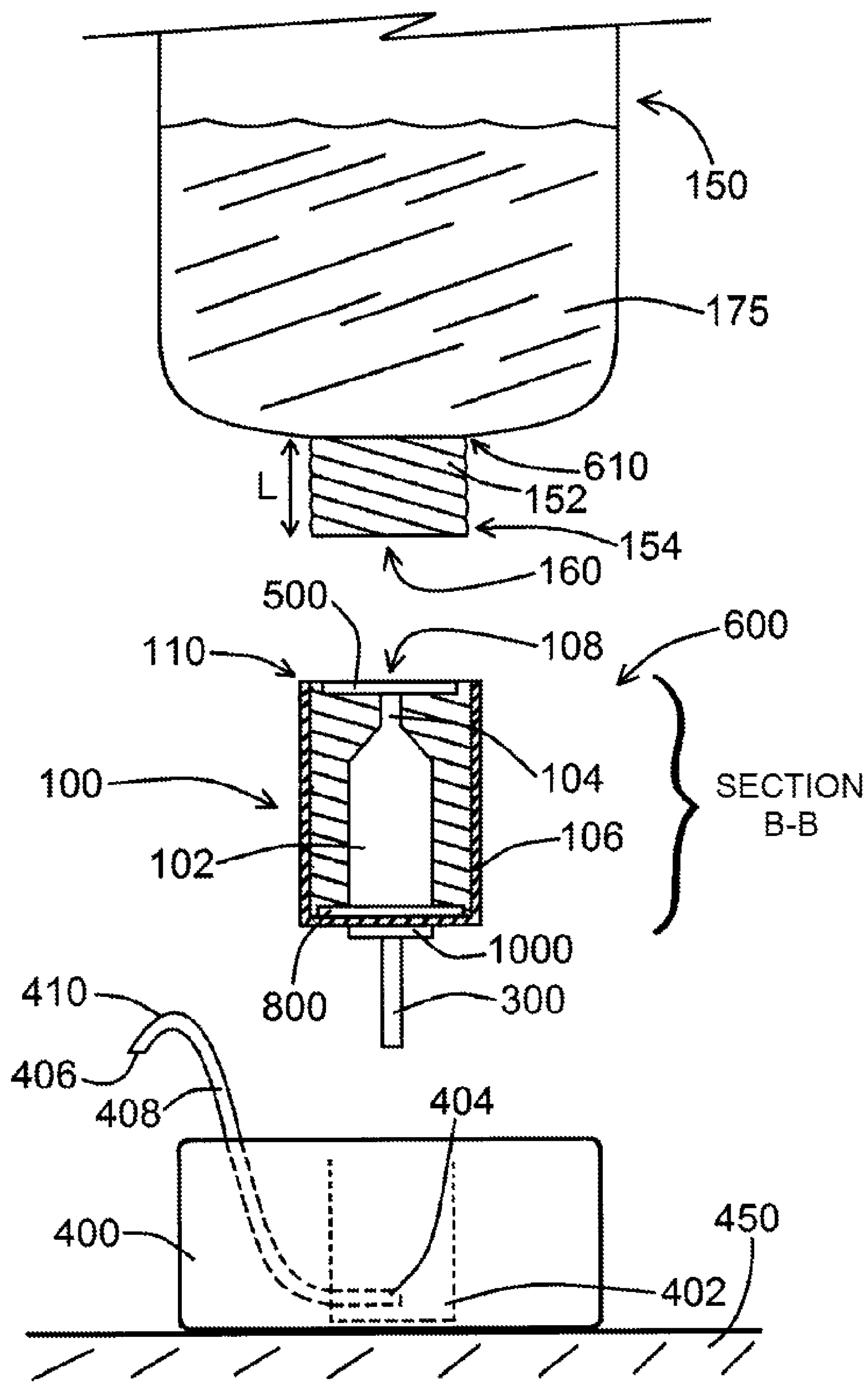
Figures 11A, 11B, 11C:
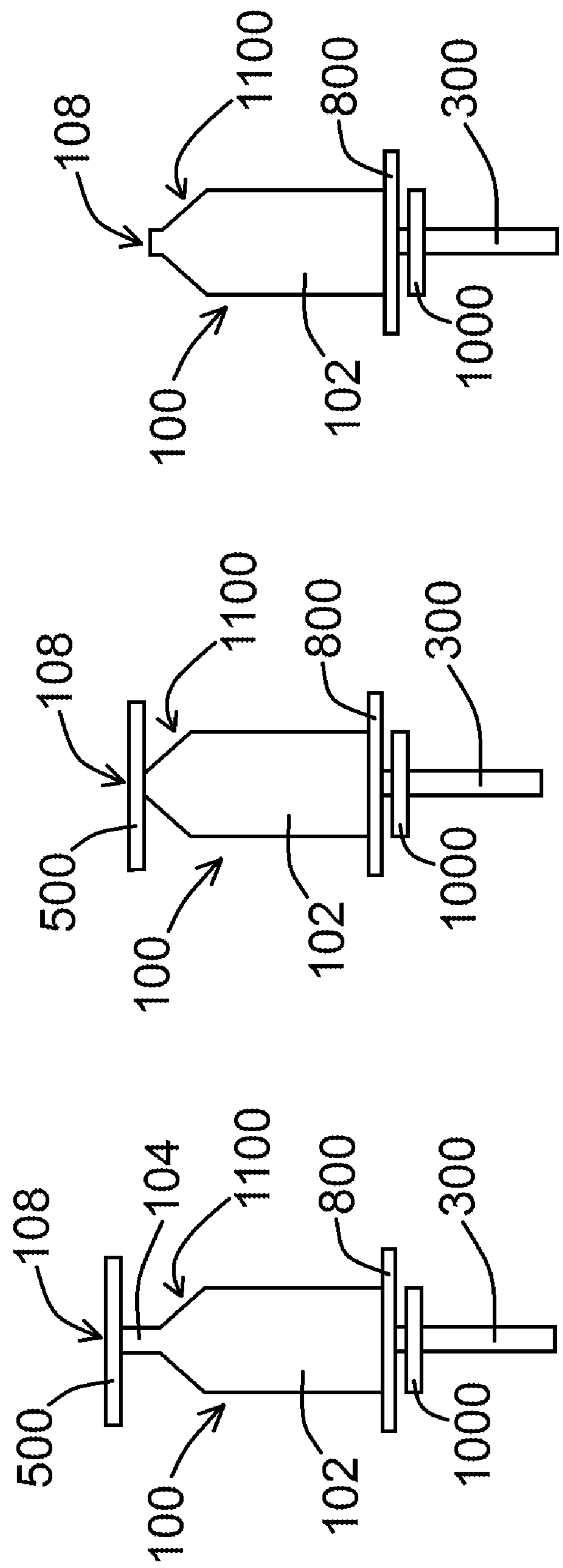
FIGS. 11A, 11B, and 11C show side views of portions of devices, according to exemplary embodiments of the present disclosure.

FIG. 10 shows yet another embodiment of an exemplary system 600 of the present disclosure. As shown therein, portions of system 600 are relatively similar to those shown in FIG. 10, except that portions of device 100 (including pump mechanism) are configured as shown in FIG. 11A. In various embodiments, and as shown in FIG. 10, skirt 106 may be at or about 50 mm in length, 2" in length, or longer or shorter as may be desired. A snap ring 1000, as shown in FIGS. 10-11C, may be used to secure pump mechanism 104 to skirt 106 by advancing snap ring 1000 over pump tube 300 toward skirt 106. Pump base 400, as shown in FIG. 10, may also comprise a relatively taller first recessed portion 402, as compared to first recessed portion shown in FIGS. 2, 6, and 9.

FIGS. 11A, 11B, and 11C show portions of exemplary devices 100 of the present disclosure. FIGS. 11A and 11B, for example, each show portions of devices 100 having gaskets 500, with gasket 500 coupled to receiving tube 104 in FIG. 11A, and gasket 500 coupled to pump mechanism 102 in FIG. 11B. Pump mechanisms 102, in various embodiments, may comprise a flared portion 1100 that flares from a relative distal end of pump mechanism 102 toward a relative bottom of pump mechanism 1100. In FIG. 11A, for example, receiving tube 104 is relatively short, such as at or about ⅜" or ½" long, as compared to longer receiving tubes shown in FIGS. 2 and 6. Pump mechanism 104 may be configured so to directly couple to a gasket 500, such as shown in FIG. 11C without gasket 500, so to have a portion of device 100 be shorter as compared to the embodiment shown in FIG. 11A, which may be desirable for certain applications. Pump tube 300, as shown in FIGS. 11A, 11B, and 11C, can be at or about 1" in length, 1½" in length, or longer or shorter, as may be desired. Gaskets 500, in various embodiments, may be at our about 2 mm thick or thicker or thinner as desired. Snap rings 1000, as shown in FIGS. 11A, 11B, and 11C, are not advanced fully toward pump mechanism 104, but would be advanced toward pump mechanism 104 at skirt 106 as shown in FIG. 10.

Figure 12A:
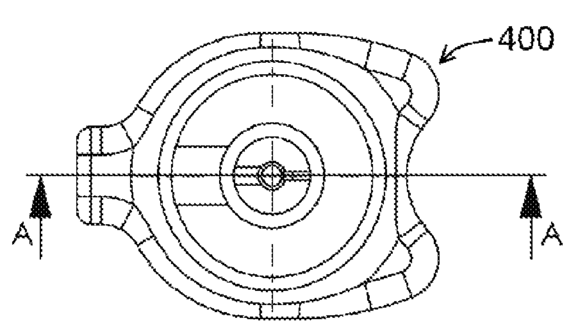
FIG. 12A shows a top-down view of a pump base, according to an exemplary embodiment of the present disclosure.
Figure 12B:
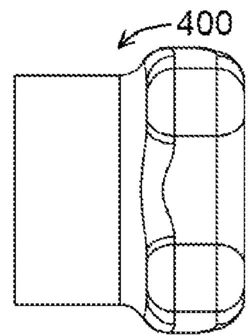
FIG. 12B shows a side view of a pump base, according to an exemplary embodiment of the present disclosure.
Figure 12C:
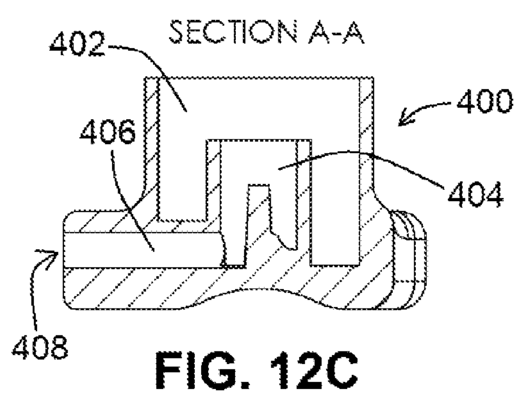
FIG. 12C shows a cross-sectional view of a pump base, according to an exemplary embodiment of the present disclosure.
Figure 12D:
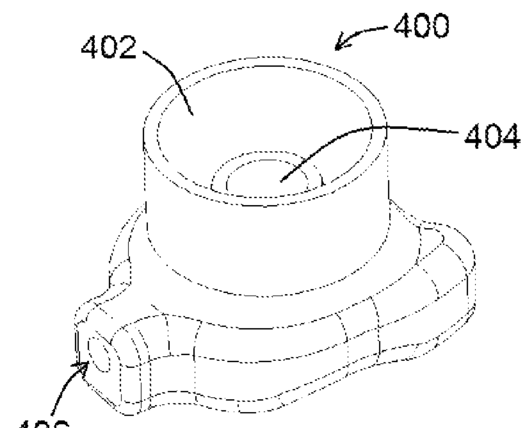
FIG. 12D shows a perspective view of a pump base, according to an exemplary embodiment of the present disclosure.
Figure 12E:
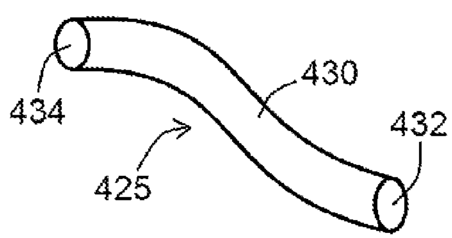
FIG. 12E shows a perspective view of an extension tube, according to an exemplary embodiment of the present disclosure.

Additional exemplary embodiments of pump bases 400 of the present disclosure are shown in FIGS. 12A-12D. FIG. 12A shows a top-down view, FIG. 12B shows a side view, FIG. 12C shows a side cross-sectional view along line A-A from FIG. 12A, and FIG. 12D shows a perspective view of an exemplary base 400 of the present disclosure. As shown in FIG. 12C, for example, an exemplary base 400 defines a first recessed portion 402 and an aperture 404, whereby aperture 404 is in communication with a lumen 408 terminating at a base opening 406. Additional components may be coupled to base 400 as may be desired to effectively extend lumen 408, such as, for example, an extension tube 425, such as shown in FIG. 12E, defining a proximal aperture 432 and a distal aperture 434 and having a lumen 430 extending therebetween, such that when extension tube 425 is positioned relative to base opening 406, contents 175 from bottle 150 can enter aperture 404, pass through lumen 408 and out of base opening 406 into proximal aperture 432, through lumen 430, and exit from distal aperture 434, for example. In at least one embodiment, part of extension tube 425 is configured to fit within base opening 406.

Figure 12F:
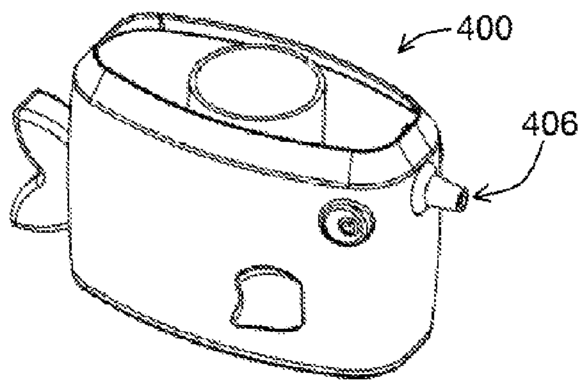
FIG. 12F shows a perspective view of a pump base, according to an exemplary embodiment of the present disclosure.

Various pump bases 400 of the present disclosure can have various shapes and/or sizes. For example, and as shown in FIG. 12F, an exemplary pump base 400 can be configured as a fish, or as any number of animals, cartoon characters, vehicles, geometric shapes, etc.

An exemplary adapter 1300 of the present disclosure is shown in FIGS. 13A-13D in various views (perspective views in FIGS. 13A, 13B, and 13D, and an end view in FIG. 13C). Adapters 1300 of the present disclosure are configured to effectively couple exemplary bottles 150 to exemplary pump bases 400 or skirts 106 in cases where, for example, the sizes of the necks of bottles 154 and skirts 106 and/or pump bases 400 do not align. For example, a neck 154 of an exemplary bottle 150 may have threads 152 whereby neck 154 has a 24 mm diameter, and skirt 106 may have threads 112 whereby skirt 106 has an effective 28 mm diameter, or where one or more features of pump base 400, such as first recessed portion, has an effective 28 mm diameter. In such instances, an exemplary adapter 1300 of the present disclosure could be used, whereby a first end 1302 has a first size and whereby a second end 1304 has a second size different from the first size. Adapters 1300 can also have first end threads 1312 and/or second end threads 1314, as may be desired, to correspond to threads 112, 152, for example. One or more grip portions 1320 may be present upon adapters 1300 to facilitate threaded connection to other parts of devices 100 of the present disclosure.

Figure 14A:
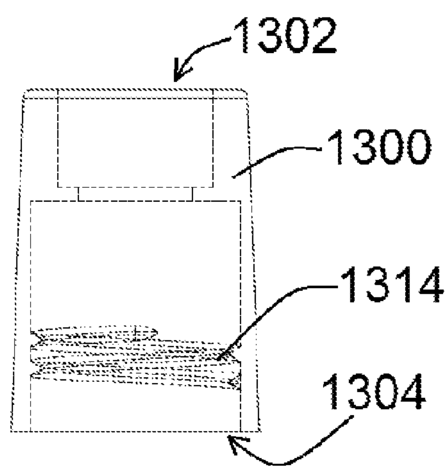
FIG. 14A shows a side view of an adapter, according to an exemplary embodiment of the present disclosure.
Figure 14B:
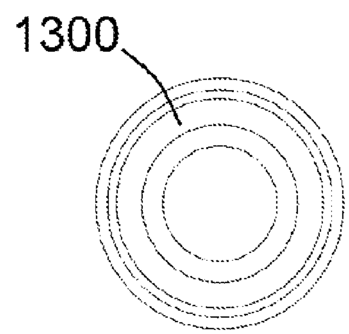
FIG. 14B shows an end view of an adapter, according to an exemplary embodiment of the present disclosure.
Figure 14C:
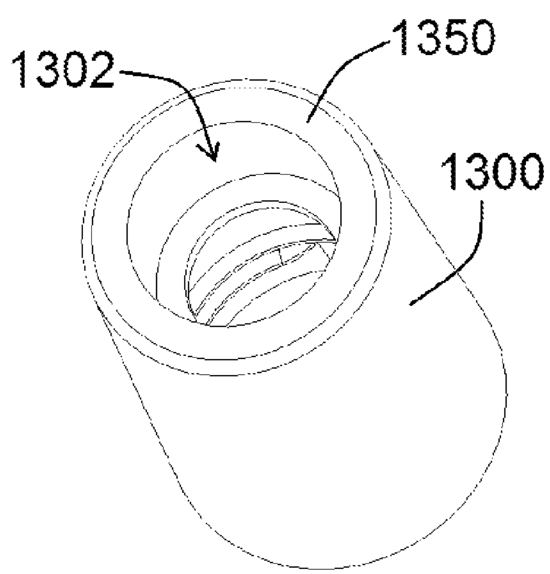
FIGS. 14C and 14D show perspective views of adapters, according to exemplary embodiments of the present disclosure.
Figure 14D:
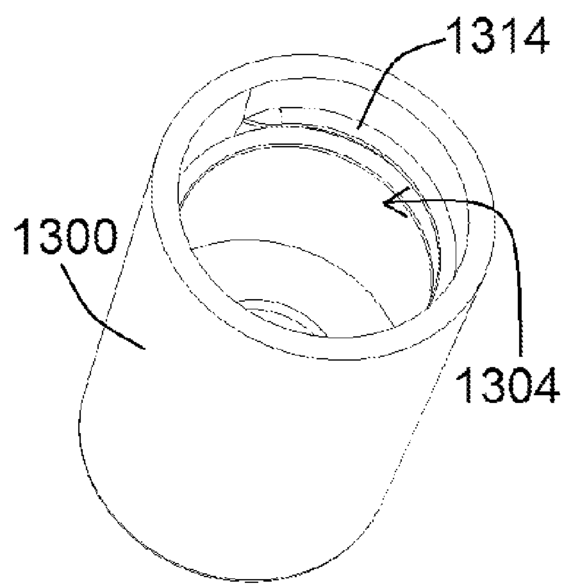

Additional adapter 1300 embodiments of the present disclosure are shown in FIGS. 14A-14D. FIG. 14A shows a side view with internal elements in dashed line format, FIG. 14B shows a top view, and FIGS. 14C and 14D show perspective views of exemplary adapters 1300. As shown in FIGS. 14A and 14D, for example, second end 1304 can have second end threads 1304 configured to couple to corresponding threads 112, 152, as may be desired. If a portion of device 100 has no threads, such as a bottle 150, a skirt 106, and/or a pump base 400, a flange 1350, such as shown in FIG. 14C, could be present on adapter 1300 so that, for example, first end 1302 of adapter can snugly fit/couple to bottle 150, skirt 106, and/or pump base 400, as may be desired. Exemplary adapters may taper from second end 1304 to first end 1302, such as shown in FIG. 14A, or may taper from first end 1302 to second end 1304 in other embodiments.

Figure 15A:
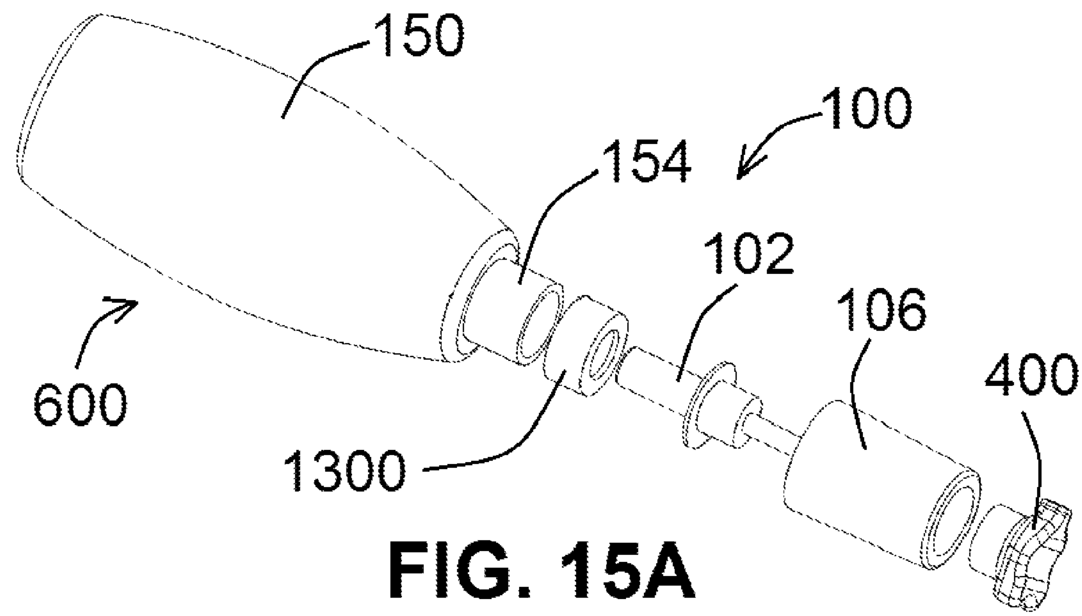
FIG. 15A shows an exploded perspective view of a system, according to an exemplary embodiment of the present disclosure.
Figure 15B:
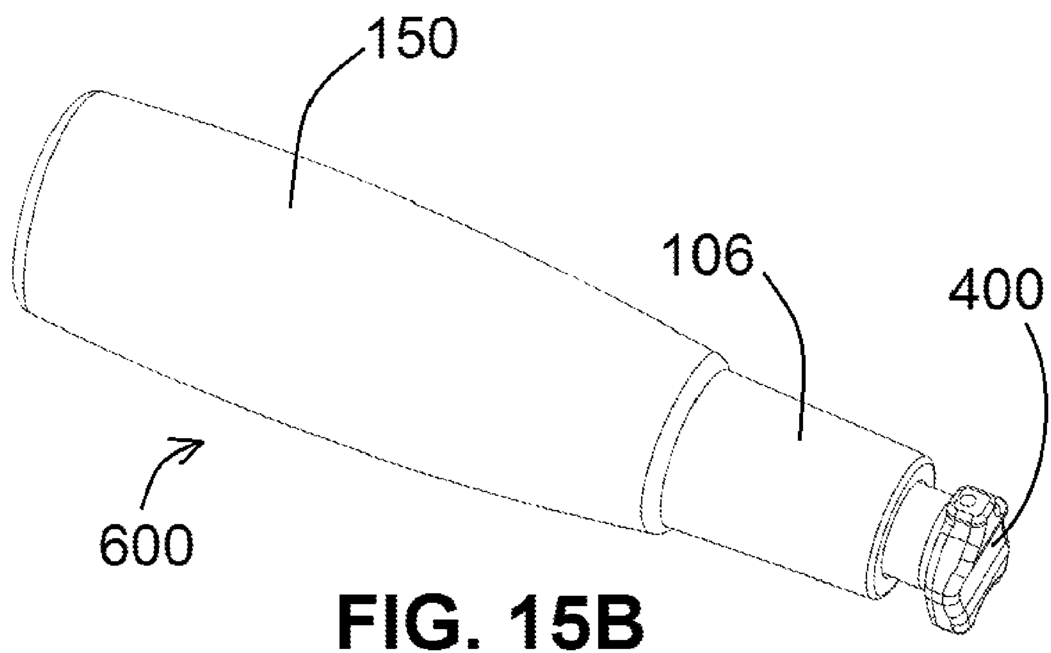
FIG. 15B shows a perspective view of a system, according to an exemplary embodiment of the present disclosure.

FIGS. 15A and 15B show components of exemplary systems 600 of the present disclosure. As shown in the exploded perspective view of FIG. 15A, an exemplary system 600 can comprise an exemplary device 100, which itself comprises a pump mechanism 102 and a skirt 106, for example, as well as a bottle 150 having a neck 154, an adapter 1300 (which can be considered as part of device 100 or as part of system 600), and a pump base 400, which can be connected as shown in the figure. FIG. 15B shows an exemplary system 600 of the present disclosure, whereby bottle 150, skirt 106, and base 400 are readily shown, noting that system 600 may further comprise other system 600 elements or other device 100 elements, such as a pump mechanism 102, shown in FIG. 15A but not shown in FIG. 15B. Adapter 1300, as shown in FIG. 15A, may be used as a spacer sleeve, a cap, etc. and in various embodiments, may have a first end 1302 and a second end 1304 of equal size (diameter, for example).

Exemplary devices 100 and systems 600 of the present disclosure, as described herein, are configured to remove 98%, 99%, or more of the liquid contents 175 of a bottle 150, including soap, lotion, hand sanitizer, or other liquid products. Devices 100 and systems 600 of the present disclosure operate without traditional dip tubes (as shown in FIG. 1), and when in use (inverted bottle 150), gravity facilitates the general downward movement of the liquid contents 175 over time, allowing most, if not all or substantially all, of the liquid contents 175 to be extracted from bottle 150 by the user.

Devices 100 features of the present disclosure include, but are not limited to, a) pump mechanism 102 and pump base 400 being located below bottle 150 (when coupled to bottle 150), b) a distal opening 510 of the receiving tube 104 being positioned above the pump mechanism 102, c) the distal opening 510 of the receiving tube 104 being positioned above base opening 406 (in at least some device 100 and/or system 600 embodiments), and d) desired operation without a dip tube. Pump mechanism 102, in various embodiments, draws content 175 from bottle 150 and pumps it downward so that content 175 exits a point lower than it enters the distal opening 510 of receiving tube 104. When a gasket 500 is used, gasket 500 surrounds the pump inlet (distal opening 510 of receiving tube 104), gasket 500 prevents contents 175 from bottle 150 from entering into the neck 154 of bottle 150 and/or into skirt 106, depending on configuration, so that some contents 175 are not inadvertently trapped within device 100 and not able to be pumped out. Furthermore, predetermined doses of content 175 (such as 1 cc, 2 cc, 3 cc, or different amounts) can be extracted per pump based upon device 100 size and/or configuration. Various devices 100 of the present disclosure are configured to be used in connection with bottles 150 having various neck 154 outer diameters, including, but not limited to, 22 mm, 24 mm, and 28 mm outer diameters. Devices 100 of the present disclosure can be scaled, for example, for use with bottles as small as 1 oz (or smaller) and up to 50 oz (or larger), depending on desired use.

While various embodiments of liquid product pump devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A device, comprising a pump mechanism coupled to a receiving tube, whereby a distal end of the receiving tube extends into a skirt, wherein when the skirt is attached to a neck of an inverted bottle having liquid contents therein and wherein when the device rests within or upon a pump base, pressing the inverted bottle downward toward the pump base causes a portion of the liquid contents to transfer from the inverted bottle and out of the pump base;

the device further comprising a first gasket coupled to the receiving tube, proportioned such that the first gasket fits within an internal diameter of the neck of the inverted bottle when the skirt is attached to the neck of the inverted bottle; and the device further comprising a second gasket, wherein the second gasket is positioned relatively below the first gasket, and wherein the second gasket is further positioned around the pump mechanism;

wherein the receiving tube terminates within the neck of the inverted bottle.

2. The device of claim 1, wherein the distal end of the receiving tube extends into the skirt but not to a distal end of the skirt.

3. The device of claim 1, wherein the distal end of the receiving tube extends to a distal end of the skirt.

4. The device of claim 3, further comprising a first gasket coupled to the receiving tube, the first gasket sized and shaped to occlude an opening of the neck of the inverted bottle when the neck of the inverted bottle is attached to the skirt.

5. The device of claim 1, wherein the first gasket prevents the liquid contents from migrating from the inverted bottle beyond the first gasket.

6. The device of claim 1, wherein the distal end of the receiving tube extends away from the distal end of the skirt, and wherein the device further comprises a first gasket coupled to the receiving tube, the first gasket sized and shaped to occlude an opening of the neck of the bottle when the neck of the inverted bottle is attached to the skirt, and wherein the distal end of the receiving tube extends into the neck of the inverted bottle, to an internal end of the neck of the inverted bottle, but not beyond the internal end of the neck of the inverted bottle.

7. The device of claim 1, forming part of a system, the system further comprising the pump base.

8. The device of claim 7, wherein the pump base defines a first recessed portion and an aperture in communication with a pump base lumen and terminating at a base opening, and wherein the portion of the liquid contents transferring from the inverted bottle pass into the aperture of the pump base, through the pump base lumen, and out of the base opening.

9. The device of claim 8, wherein the system further comprises an extension tube coupled to the pump base, and wherein when the device rests within or upon the pump base, pressing the inverted bottle downward toward the pump base causes a portion of the liquid contents to transfer from the inverted bottle, into the aperture of the pump base, through the pump base lumen, out of the base opening, into a lumen of the extension tube, and out of a distal aperture of the extension tube.

10. The device of claim 1, forming part of a system, the system further comprising the pump base and the bottle.

11. The device of claim 1, wherein the device further comprises a gasket extending to at least a perimeter of the neck of the inverted bottle;

wherein the receiving tube extends into the skirt but not beyond a distal end of the skirt, and wherein the skirt is positioned around the receiving tube.

12. The device of claim 1, wherein the distal end of the receiving tube extends one of proximal to a distal end of the skirt, even with a distal end of the skirt, and wherein the distal end of the receiving tube extends further than the distal end of the skirt.

13. The device of claim 1, wherein an effective lumen extends from the aperture to the base opening, wherein the device further comprises an extension tube comprising a proximal aperture and a distal aperture, and wherein the extension tube is positioned one of connected to the base opening and fit within the base opening.

14. The device of claim 1, further comprising a snap ring coupled to a pump tube, configured to secure the pump mechanism to the skirt.

15. A device, comprising a pump mechanism coupled to a receiving tube, whereby a distal end of the receiving tube extends into a skirt, wherein when the skirt is attached to a neck of an inverted bottle having liquid contents therein and wherein when the device rests within or upon a pump base, pressing the inverted bottle downward toward the pump base causes a portion of the liquid contents to transfer from the inverted bottle and out of the pump base; the device further comprising a first gasket coupled to the receiving tube, proportioned such that the first gasket fits within an internal diameter of the neck of the inverted bottle when the skirt is attached to the neck of the inverted bottle; and the device further comprising an adapter configured to effectively couple the neck of the bottle to a skirt in cases when the size of the neck of the bottle and the skirt do not align;

wherein the receiving tube terminates within the neck of the inverted bottle.

16. The device of claim 15, forming part of a system, the system further comprising the pump base.

17. The device of claim 15, forming part of a system, the system further comprising the pump base and the bottle.

18. The device of claim 15, wherein the distal end of the receiving tube extends distal to a distal end of the skirt.

* * * * *